US012752689B2

(12) United States Patent
Wakabayashi

(10) Patent No.: US 12,752,689 B2
(45) Date of Patent: Oct. 6, 2026

(54) STORAGE DEVICE

(71) Applicant: MORIROKU TECHNOLOGY COMPANY, LTD., Tokyo (JP)

(72) Inventor: Takafumi Wakabayashi, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 348 days.

(21) Appl. No.: 18/390,921

(22) Filed: Dec. 20, 2023

(65) Prior Publication Data

US 2024/0208384 A1 Jun. 27, 2024

(30) Foreign Application Priority Data

Dec. 27, 2022 (JP) ................................ 2022-209335

(51) Int. Cl.
*B60N 2/75* (2018.01)

(52) U.S. Cl.
CPC .................................. *B60N 2/793* (2018.02)

(58) Field of Classification Search
CPC ............ B60N 2/793; B60N 2/79; B60N 2/75
USPC ........................................................ 296/34
See application file for complete search history.

(56) References Cited

U.S. PATENT DOCUMENTS

2005/0205591 A1 9/2005 Kogami
2022/0340084 A1 10/2022 Takano et al.

FOREIGN PATENT DOCUMENTS

| | | | | | |
|---|---|---|---|---|---|
| EP | 1882611 | A2 | | 1/2008 | |
| JP | S59-136866 | U | | 9/1984 | |
| JP | 2005247232 | A | * | 9/2005 | ................ E05F 1/14 |
| JP | 2008024202 | A | * | 2/2008 | |
| JP | 2016-216009 | A | | 12/2016 | |
| JP | 2022167232 | A | * | 11/2022 | ............... B60R 7/04 |

OTHER PUBLICATIONS

Takano et al., JP 2022167232. English translation dated Dec. 3, 2024. (Year: 2022).*
Tani et al., JP 2008024202. English translation dated Dec. 3, 2024. (Year: 2008).*
Kojo, JP 2005247232. English translation dated Dec. 3, 2024. (Year: 2005).*

* cited by examiner

*Primary Examiner* — Caroline N Butcher
(74) *Attorney, Agent, or Firm* — Rankin, Hill & Clark LLP

(57) ABSTRACT

A storage device includes a support shaft for supporting the lid to the container such that the lid can open and close relative to the container, a torsion spring for biasing the lid in a direction to open the lid, and a cylindrical cover that surrounds an outer peripheral surface of a coil of the torsion spring. The torsion spring includes a first arm and a second arm. The second arm can be engaged with the container when the container, the lid and the support shaft are in the assembled state and the first arm is engaged with the lid. The cover has clearance (cutout) that allows the second arm to pass without interference.

5 Claims, 11 Drawing Sheets

STORAGE DEVICE

FIELD OF THE INVENTION

The present invention relates to an improvement to a storage device provided with a lid that opens and closes an opening of a container.

BACKGROUND

A certain type of a storage device biases a lid, which can open and close an opening of the container, in a closing direction or an opening direction by a torsion spring. One of known storage devices of this type is, for example, a console box for a vehicle. A conventional structure of the console box for the vehicle is disclosed in, for example, JP-A-2016-216009.

The console box (storage device) for the vehicle disclosed in JP-A-2016-216009 includes an armrest (corresponding to a lid) for opening and closing an opening of a console box body (corresponding to a container), a shaft support (corresponding to a supporting shaft) for supporting the armrest such that the armrest can open and close with respect to the console box body, and a torsion spring for biasing the armrest in the opening direction. An outer peripheral surface of a coil of the torsion spring is surrounded by a cylindrical body holder formed integrally with the console box body (corresponding to a cover).

The torsion spring includes an opposite end (corresponding to a first arm) extending from one winding end of the coil to the armrest and capable of engaging with the armrest, and one end (corresponding to a second arm) extending from the other winding end (opposite winding end) of the coil to the console box body and capable of engaging with an inside of a spring holder.

The tip of the other end of the torsion spring is a first folded portion which is folded back in a U-shape. The first folded portion fits in an engagement groove of the armrest such that the armrest and the first folded portion engage with each other.

The tip of one end of the torsion spring is a second folded portion which is folded back in an L-shape. The second folded portion fits in a hole of the console box body such that the second folded portion engages with the console box body.

When assembling the console box, first, the coil fits in the console body holder while the second folded portion of the torsion spring is engaging with the hole of the console box body. The first folded portion of the torsion spring is located outside the spring holder in the axial direction. In this state, the load (biasing force of the torsion spring) is not applied to one end and the opposite end of the torsion spring.

Next, the engagement groove of the armrest engages with the first folded portion of the torsion spring while aligning the center axis of the console box body with the center axis of the armrest. In this state, the load (biasing force of the torsion spring) is applied to one end and the opposite end of the torsion spring.

Finally, the center axis of the console box body is aligned with the center axis of the armrest while resisting this biasing force, and the shaft support is attached to the console box body and the armrest.

SUMMARY

When the storage device of JP-A-2016-216009 is assembled, the center axis of the console box body is aligned with the center axis of the armrest while receiving the biasing force from the torsion spring, and the shaft support is attached. Therefore, it is difficult to ensure the alignment. In other words, since the assembly work is performed while being affected by the biasing force of the torsion spring, there is room for improvement in the assembly workability.

An object of the present disclosure is to provide a storage device with an improved assembling workability.

According to the present disclosure, there is provided a storage device that includes:

- a container;
- a lid for opening and closing an opening of the container;
- a support shaft for supporting the lid with respect to the container such that the lid can open and close relative to the container;
- a torsion spring that has a coil located along an axial line of the support shaft, a first arm extending from one winding end of the coil to the lid and can engage with the lid, and a second arm extending from an opposite winding end of the coil to the container and can engage with the container when the container, the lid and the support shaft are in an assembled state and the first arm is engaged with the lid, the torsion spring being configured to bias the lid in a direction to close the lid or in a direction to open the lid; and
- a cylindrical cover formed integrally with the container such that the cover can surround an outer peripheral surface of the coil,
- wherein the second arm extends outward in a radial direction than the cover, and has an engaging portion at an outer end of the second arm in the radial direction such that the engaging portion engages with an engagement portion of the container, and
- the cover has clearance that allows the second arm to pass without interference.

The present invention can provide a storage device with an improved assembling workability.

DETAILED DESCRIPTION

Embodiments of the present invention will be described below with reference to the accompanying drawings. It should be noted that the embodiments illustrated in the accompanying drawings are examples of the present invention, and the present invention is not limited to the illustrated embodiments.

First Embodiment

Referring to FIGS. 1-9, a storage device 10 of a first embodiment of this disclosure will be described.

Figure 1:
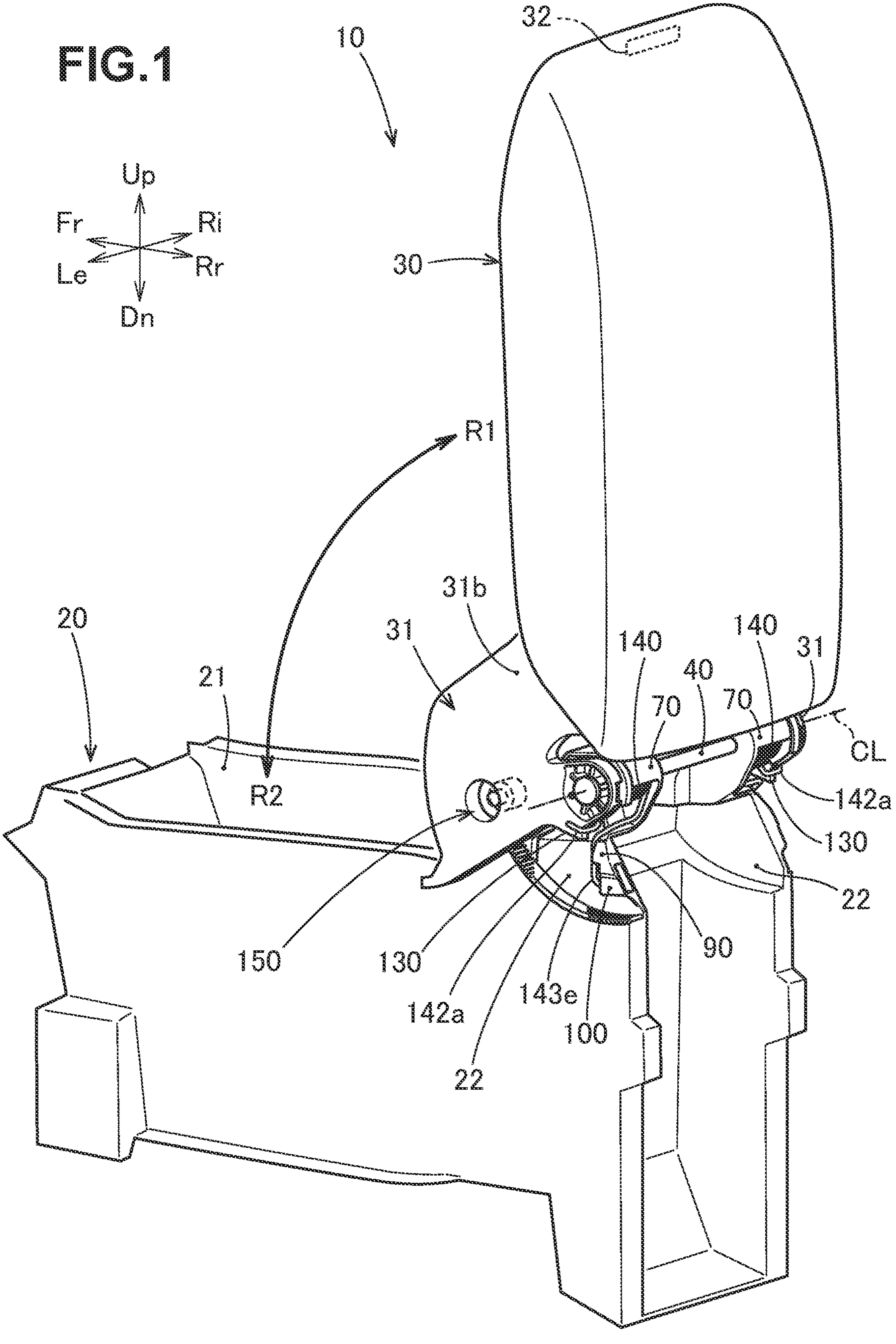
FIG. 1 illustrates a perspective view of a storage device according to a first embodiment when viewed from the left rear.

FIG. 1 illustrates an overall structure of the storage device 10. The storage device 10 includes a container 20, and a lid 30 for opening and closing an opening 21 at an upper end of the container 20 in the up-down direction. One end of the lid 30 is supported by a support shaft 40 such that the lid 30 can open and close relative to the container 20. The storage device 10 is used, for example, as a center console box for a vehicle. The center console box for the vehicle is disposed between a driver's seat and a passenger seat in the vehicle.

In the following description, terms "front", "rear", "left", "right", "up" and "down" refer to the front, the rear, the left, the right, the upward and the downward when the lid 30 is viewed from a base end of the lid in the opening-closing direction. In the drawings, "Fr" indicates the front, "Rr" indicates the rear, "Le" indicates the left, "Ri" indicates the right, "Up" indicates the top or up, and "Dn" indicates the bottom or down.

As illustrated in FIG. 1, the container 20 (console box body 20) is a box-shaped resin molded product that is rectangular and elongated in the front-rear direction when viewed from the top, and the entire upper end thereof is the opening 21. The container 20 has a right bracket 22 and a left bracket 22 at the rear upper end. These brackets 22, 22 extend upward from the rear upper end of the container 20, and face each other. The brackets 22 and 22 are integral with an extension plate 24 extending in the upper rear direction from the upper end of a rear wall 23 of the container 20 (see FIG. 4). The extension plate 24 may be part of the rear wall 23 that extends in the upper rear direction.

The lid 30 is configured to be able to close the entire opening 21 of the container 20, and has vertical plate-shaped left and right legs 31, 31 extending in the lower rear direction from the rear end of the lid 30. The plate surfaces of the two legs 31 and 31 face each other. The legs 31 and 31 are supported on the left and right brackets 22 and 22, respectively, by the support shaft 40. Therefore, the rear end of the lid 30 is supported on the container 20 such that the lid 30 can open and close. The lid 30 can be latched in a closed position against the container 20 by means of a clamp 32 provided at the front end of the lid 30.

The left and right support structures of the lid 30 relative to the container 20 will now be described in detail. Since the right support structure is the same as the left support structure, only the left support structure will be described.

Figure 2:
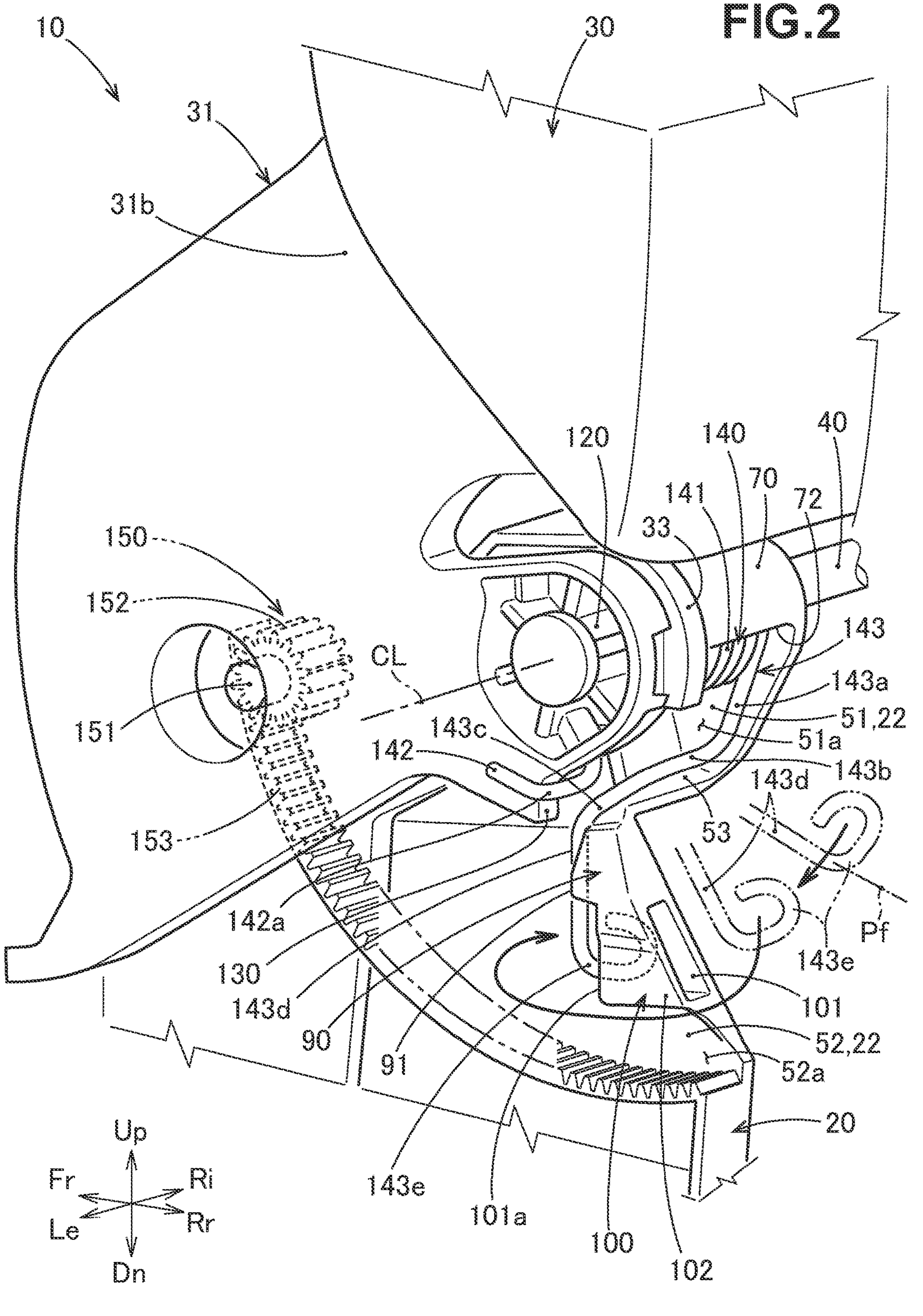
FIG. 2 illustrates an enlarged view of a support structure on the left side of a lid with respect to a container illustrated in FIG. 1.
Figure 3:
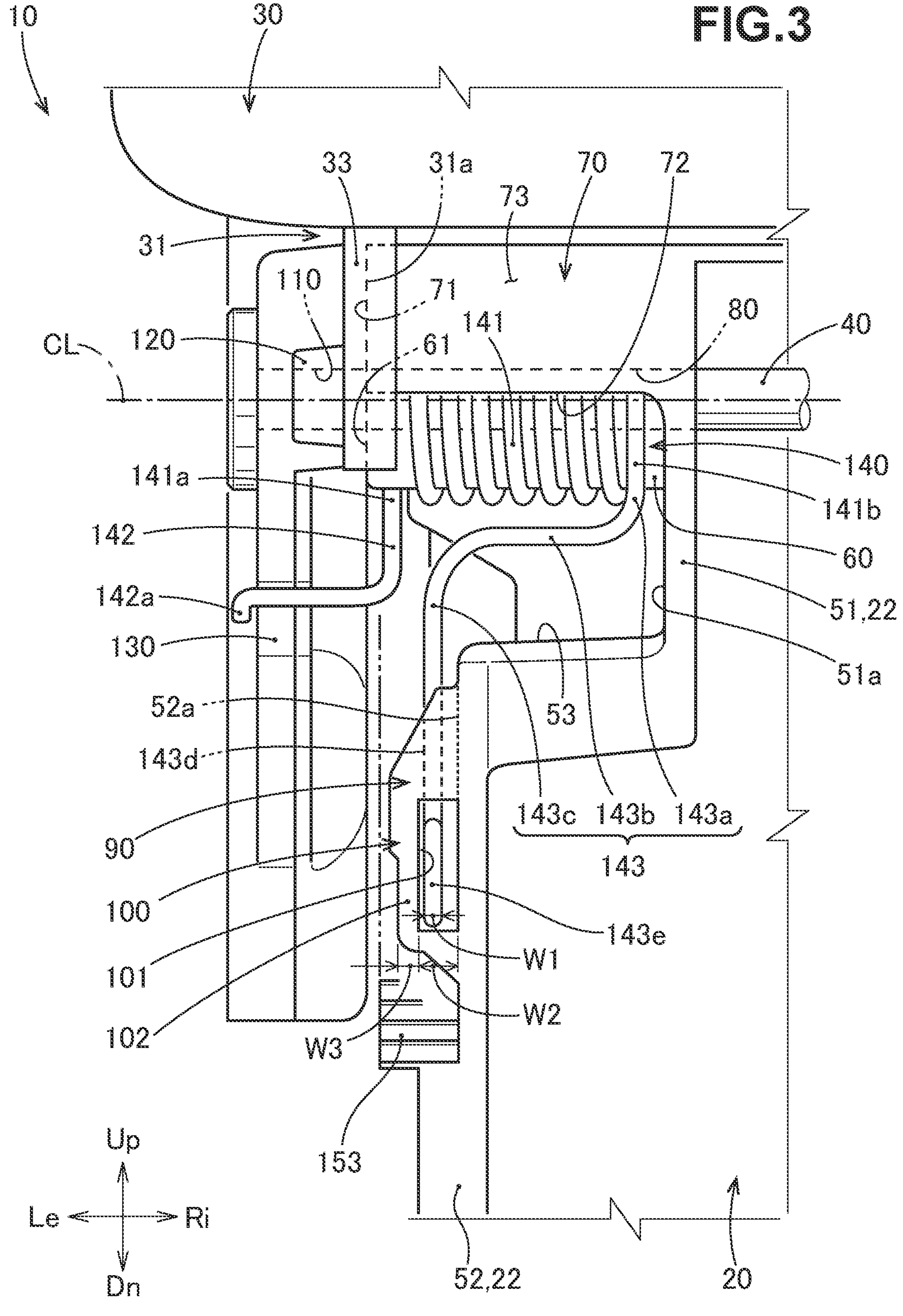
FIG. 3 illustrates a rear view of the left support structure illustrated in FIG. 2.

As illustrated in FIGS. 2 and 3, the left bracket 22 includes an upper bracket portion 51 at the rear upper end, and a lower bracket portion 52 that extends downward from a lower end of the upper bracket portion 51. An outer surface **52*a* of the lower bracket portion 52 protrudes outward in the width direction of the container 20 (Le-Rr direction) than the outer surface 51*a* of the upper bracket portion 51. Therefore, the boundary between the upper bracket portion 51 and the lower bracket portion 52 defines a step surface 53**.

As illustrated in FIGS. 2-6, the upper bracket portion 51 has a cylindrical coil-support 60 and a cylindrical cover 70, both of which protrude outward from the upper end of the outer surface **51*a* in the width direction of the container 20. The cover 70 surrounds the outer periphery of the coil support 60. The coil support 60 and the cover 70 extend outward in the direction of the axial line CL of the support shaft 40 from the outer surface 51*a* of the upper bracket 51, i.e., the coil support 60 and the cover 70 extend outward in the width direction of the container 20** (Le-Rr direction).

Along the center line of the coil support 60, formed is a shaft support hole 80 that can receive the support shaft 40. The shaft support hole 80 penetrates the brackets 22, 22 and the coil support 60 in the right-left direction (width direction of the container 20).

The lower bracket 52 has an engagement portion 90 and a disengagement restricting portion 100, both of which protrude outward in the direction of the axial line CL of the support shaft 40 from the outer surface **52*a* of the lower bracket 52. The engagement portion 90 is located, for example, directly below the coil support 60 and the cover 70. The disengagement restricting portion 100 is located opposite to the coil support 60 with respect to the engagement portion 90, e.g., the disengagement restricting portion 100 is located below the engagement portion 90. The disengagement restricting portion 100 is integral with the engagement portion 90 or spaced from the engagement portion 90**.

Thus, the left bracket 22 has the coil support 60, the cover 70, the shaft support hole 80, the engagement portion 90 and the disengagement restricting portion 100, all of which are integral with the upper end of the left side surface of the left bracket 22.

As illustrated in FIG. 3, an end face 61 of the coil support 60 and an end face 71 of the cover 70 are located outside the outer surface **52*a* of the lower bracket 52 when viewed in direction of the axial line CL of the shaft support hole 80 (direction of the axial line CL of the support shaft 40**).

Figure 4:
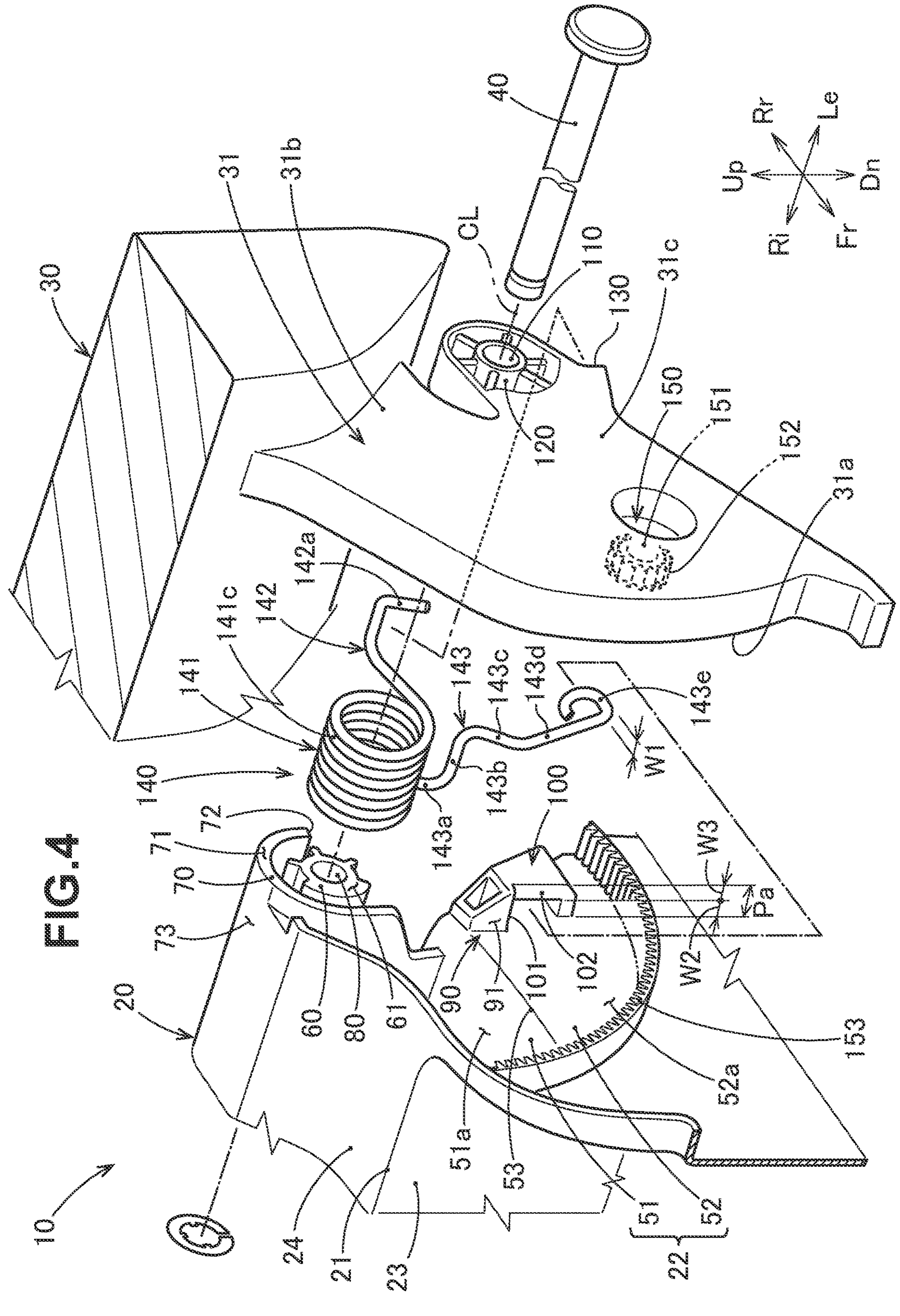
FIG. 4 illustrates an exploded perspective view of the left support structure illustrated in FIG. 2 when viewed from the left front.
Figure 5:
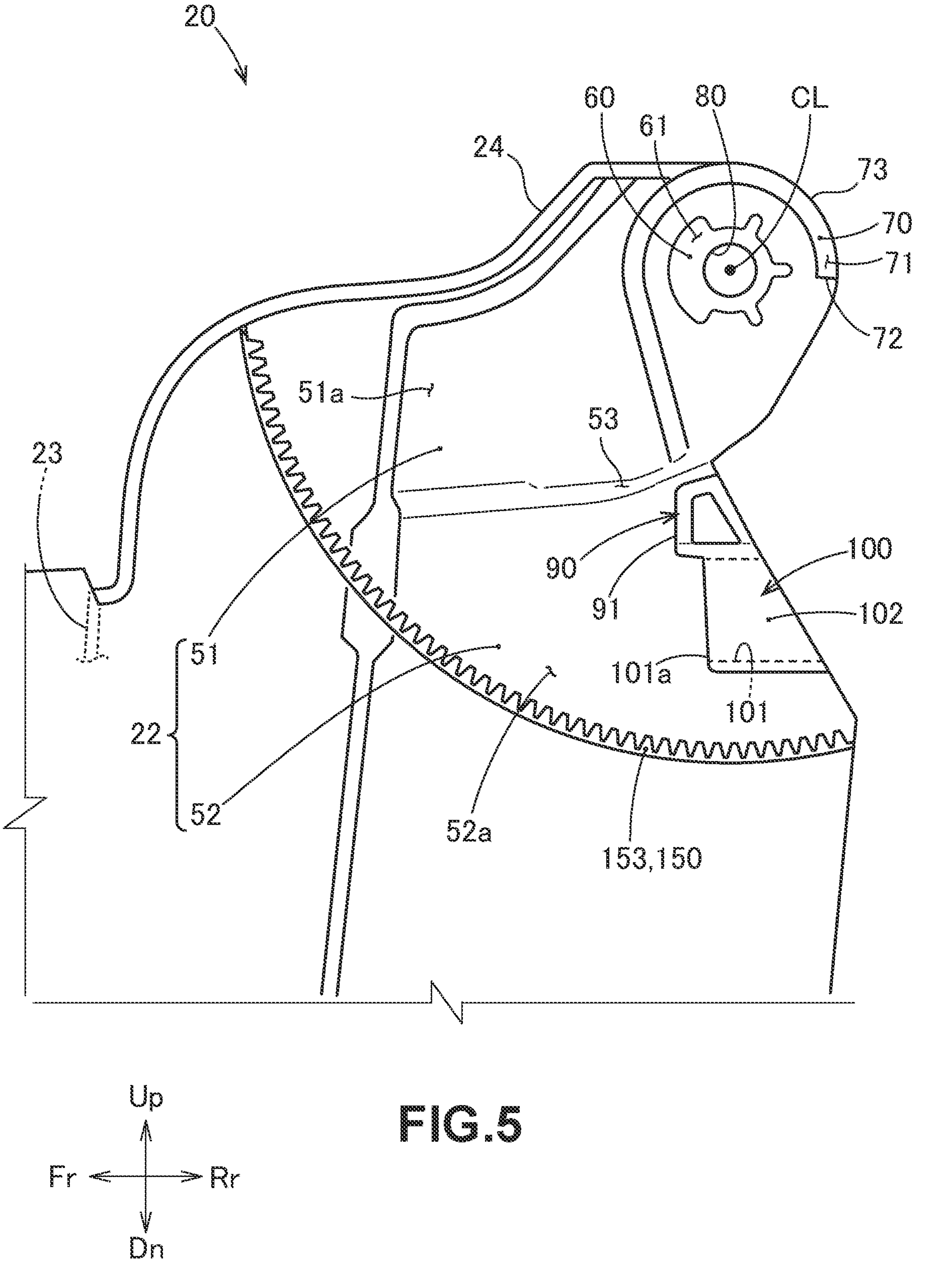
FIG. 5 illustrates a side view of a bracket illustrated in FIG. 4.

As illustrated in FIGS. 2-4, the inner surface **31*a* of the left leg 31 of the lid 30 contacts the end face 61 of the coil support 60 and the end face 71 of the cover 70 when viewed in the direction of the axial line CL of the support shaft 40**.

Figure 6:
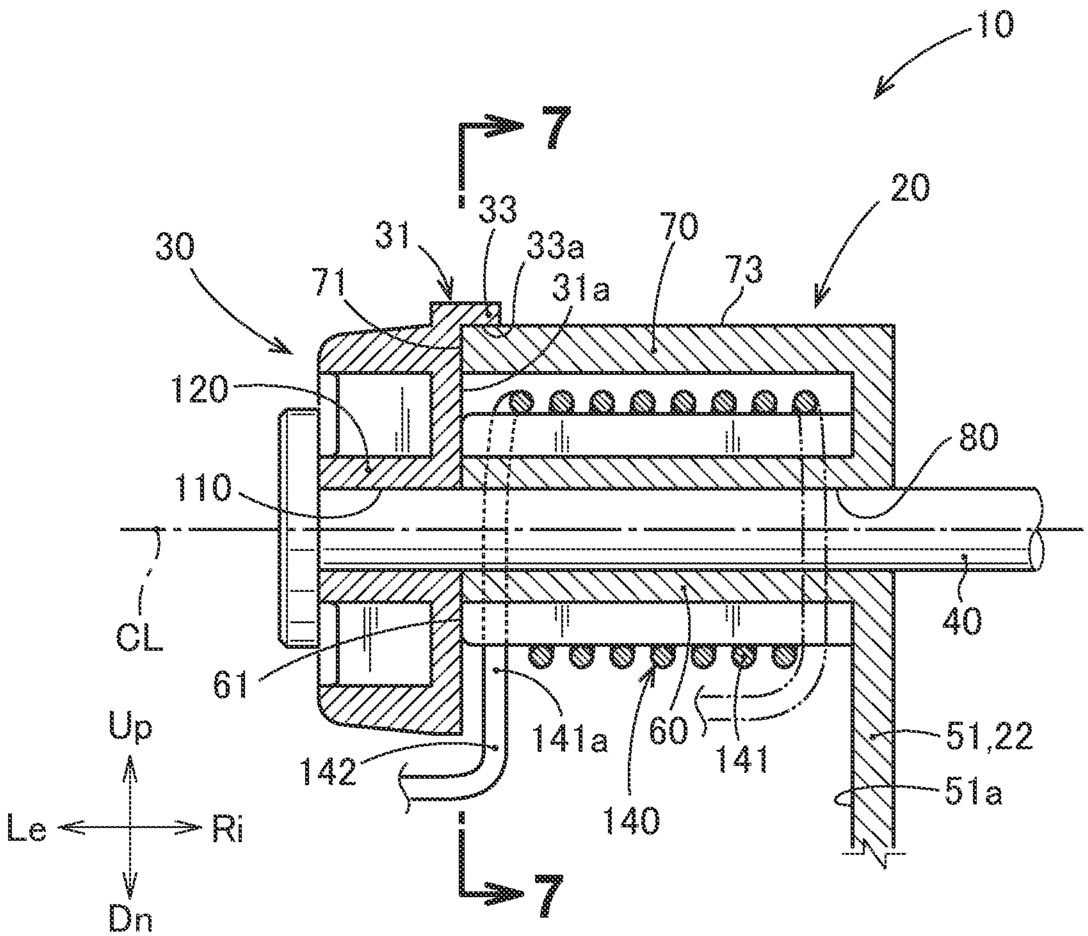
FIG. 6 illustrates a cross-sectional view of a bracket, legs, a support shaft, a torsion spring and their vicinity illustrated in FIG. 3.
Figure 7:
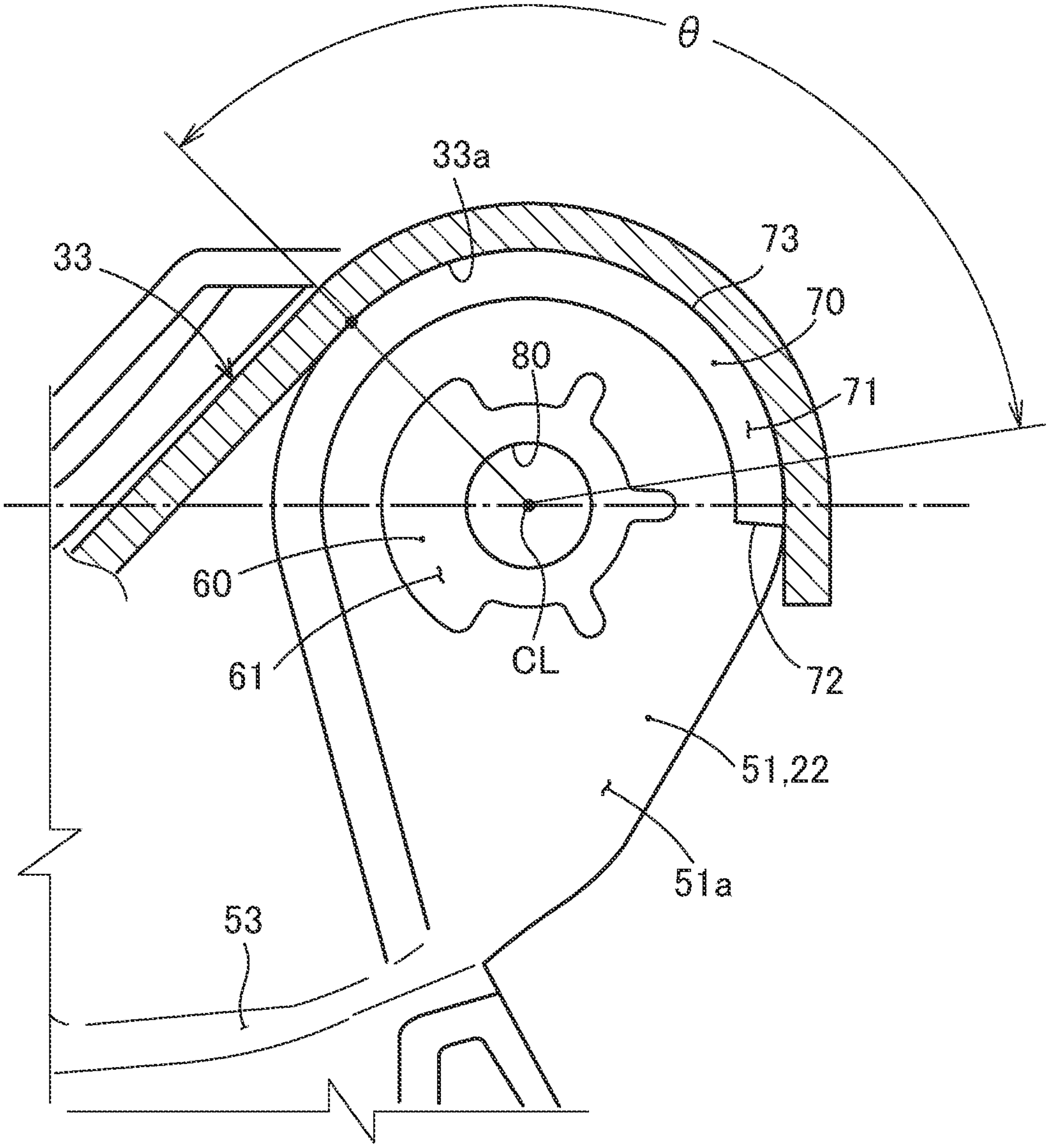
FIG. 7 illustrates a cross-sectional view taken along the line 7-7 in FIG. 6.
Figure 8:
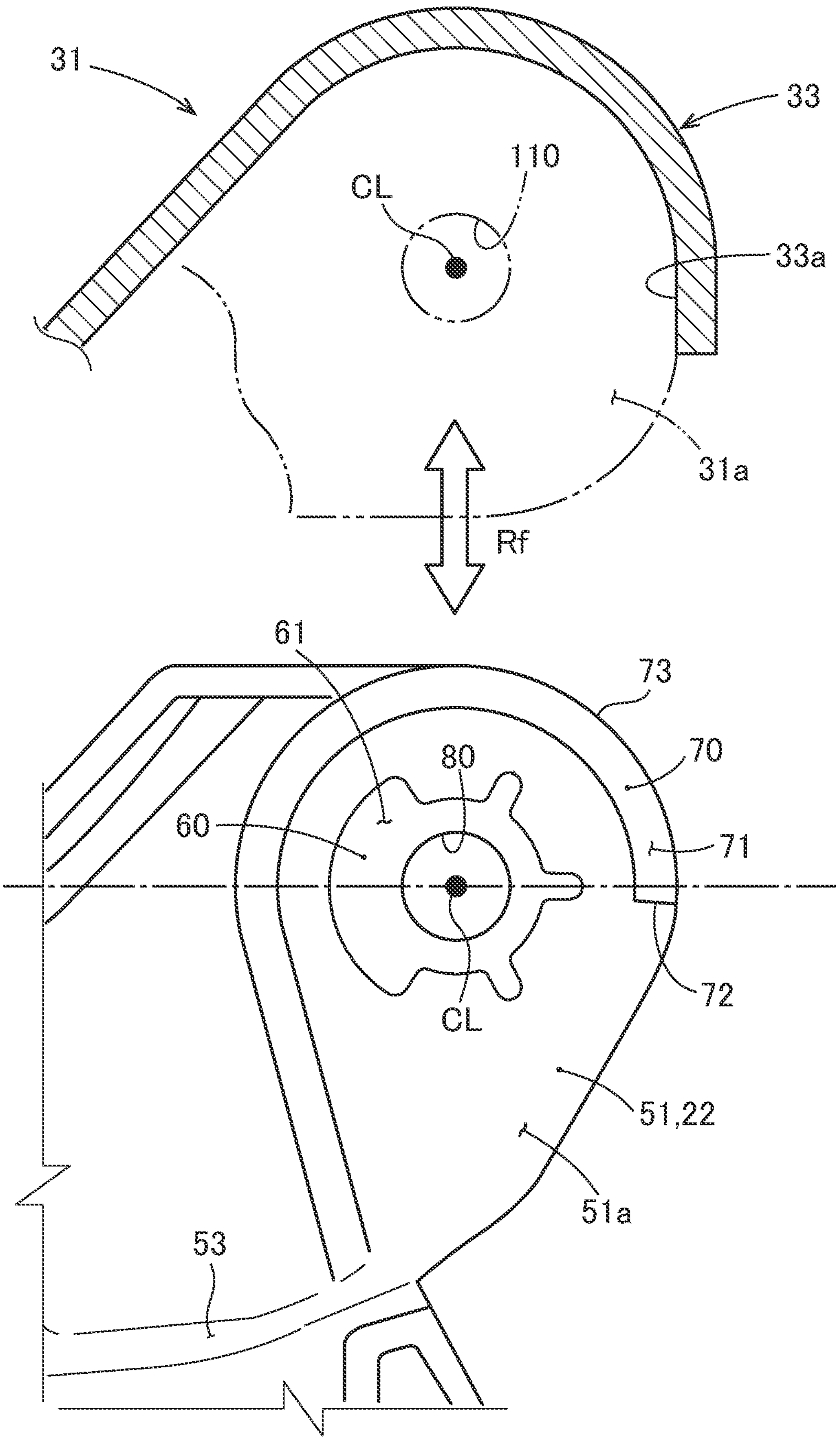
FIG. 8 illustrates an exploded view of a cover and an alignment unit illustrated in FIG. 7.

Referring also to FIGS. 7 and 8, the storage device 10 has an alignment portion 33 for aligning the axial line CL of the support shaft 40 between the container 20 and the lid 30. The alignment portion 33 is a member that engages over the outer peripheral surface 73 of the cylindrical cover 70 such that the alignment portion 33 is detachable in a direction Rf perpendicular to the axial line CL of the support shaft 40. The alignment portion 33 protrudes from the inner surface **31*a* of the leg 31 (see FIG. 6) toward the cover 70 in the direction of axial line CL of the support shaft 40**.

As shown in FIG. 7, the inner peripheral surface **33*a* of the alignment portion 33 is formed in an arc shape that can fit over the outer peripheral surface 73 of the cover 70 when viewed in the direction of the axial line CL of the support shaft 40. A contact range θ (fitting range theta) between the outer peripheral surface 73 of the cover 70 and the inner peripheral surface 33*a* of the alignment portion 33** is set not to exceed 180 degrees.

Therefore, as illustrated in FIG. 8, the alignment portion 33 can be attached to and detached from the cover 70 in a directional Rf perpendicular to the direction of the axial line CL of the support shaft 40. The attaching/detaching direction Rf is, for example, a direction that allows the alignment portion 33 to attach to and detach from the cover 70 while the lid 30 is in a full open position with respect to the container 20, as illustrated in FIG. 1. Moreover, when the alignment portion 33 fits over the cover 70, the center CL of the shaft support hole 110 formed in the leg 31 (axial line CL) coincides to the center CL of the shaft support hole 80 formed in the bracket 22 (axial line CL).

Preferably, the contact range θ illustrated in FIG. 7 is set to be between 120 degrees and 180 degrees from the viewpoint of positioning of the center of the shaft support hole 110 with respect to the shaft support hole 80 and from the viewpoint of positioning accuracy.

As illustrated in FIGS. 2-4, a shaft support 120 having a shaft support hole 110 and an engagement portion (portion to be hooked on) 130 located in the vicinity of the shaft support 120 are formed at the base 31*b* of the leg 31 (rear end 31*b*). The shaft support hole 110 penetrates the leg 31 in the left-right direction (width direction of the lid 30) such that the shaft support hole 110 can receive the support shaft 40. As the support shaft 40 is fitted into the shaft support hole 110 of the leg 31 and the shaft support hole 80 of the bracket 22, the lid 30 is supported on the container 20 such that the lid 30 can open and close relative to the container 20. The engagement portion 130 is located offset from the axial line CL of the support shaft 40.

The shaft support hole 110 formed in the leg 31 of the lid 30 may be referred to as a first shaft support hole 110, and the shaft support hole 80 formed in the bracket 22 of the container 20 may be referred to as a second shaft support hole 80. Further, the engagement portion 130 formed on the leg 31 of the lid 30 may be referred to as a first engagement portion (hook stop) 130, and the engagement portion 90 formed on the bracket 22 of the container 20 may be referred to as a second engagement portion (hook stop) 90.

As illustrated in FIG. 1, the storage device 10 also includes torsion springs 140 and 140 which bias the lid 30 toward a directional R1 to open the lid 30 or a directional R2 to close the lid 30. In the illustrated embodiment, the torsion springs 140 and 140 are configured to bias the lid 30 in the directional R1 to open the lid 30.

As illustrated in FIG. 6, the torsion spring 140 includes a coil 141 located along the axial line CL of the support shaft 40, a first arm 142 at one winding end 141*a* of two winding ends of the coil 141, and a second arm 143 at the other winding end (opposite winding end) 141*b* of the coil 141. The outer peripheral surface 141*c* of the coiling 141 is surrounded by the cylindrical cover 70.

The above-mentioned "one winding end 141*a*" may be referred to as a "first winding end 141*a*", and the other winding end 141*b* may be referred to as a "second winding end 141*b*".

As illustrated in FIGS. 3 and 6, the movement of the coil 141 in the axial line CL of the support shaft 40 is restricted by the outer surface of the bracket 22 (the outer surface 51*a* of the upper bracket portion 51) and the inner surface 31*a* of the legs 31. The first winding end 141*a* of the coil 141 is positioned close to the leg 31 when viewed in the axial line CL of the support shaft 40. The second winding end 141*b* of the coil 141 is positioned close to the outer surface of the bracket 22 (outer surface 51*a* of the upper bracket 51) when viewed in the axial line CL of the support shaft 40.

The first arm 142 extends from the first winding end 141*a* of the coil 141 to the lid 30 in the tangential direction of the coil 141. That is, the first arm 142 extends from the first winding end 141*a* toward the first engagement portion 130 of the leg 31. At the distal end of the first arm 142, formed is an L-shaped first engaging portion 142*a* (hook 142*a*) which can engage with (hooks on) the first engagement portion 130.

The second arm 143 extends from the second winding end 141*b* of the coil 141 to the container 20. That is, the second arm 143 extends toward the second engagement portion 90 of the bracket 22 from the second winding end 141*b*.

Figure 9:
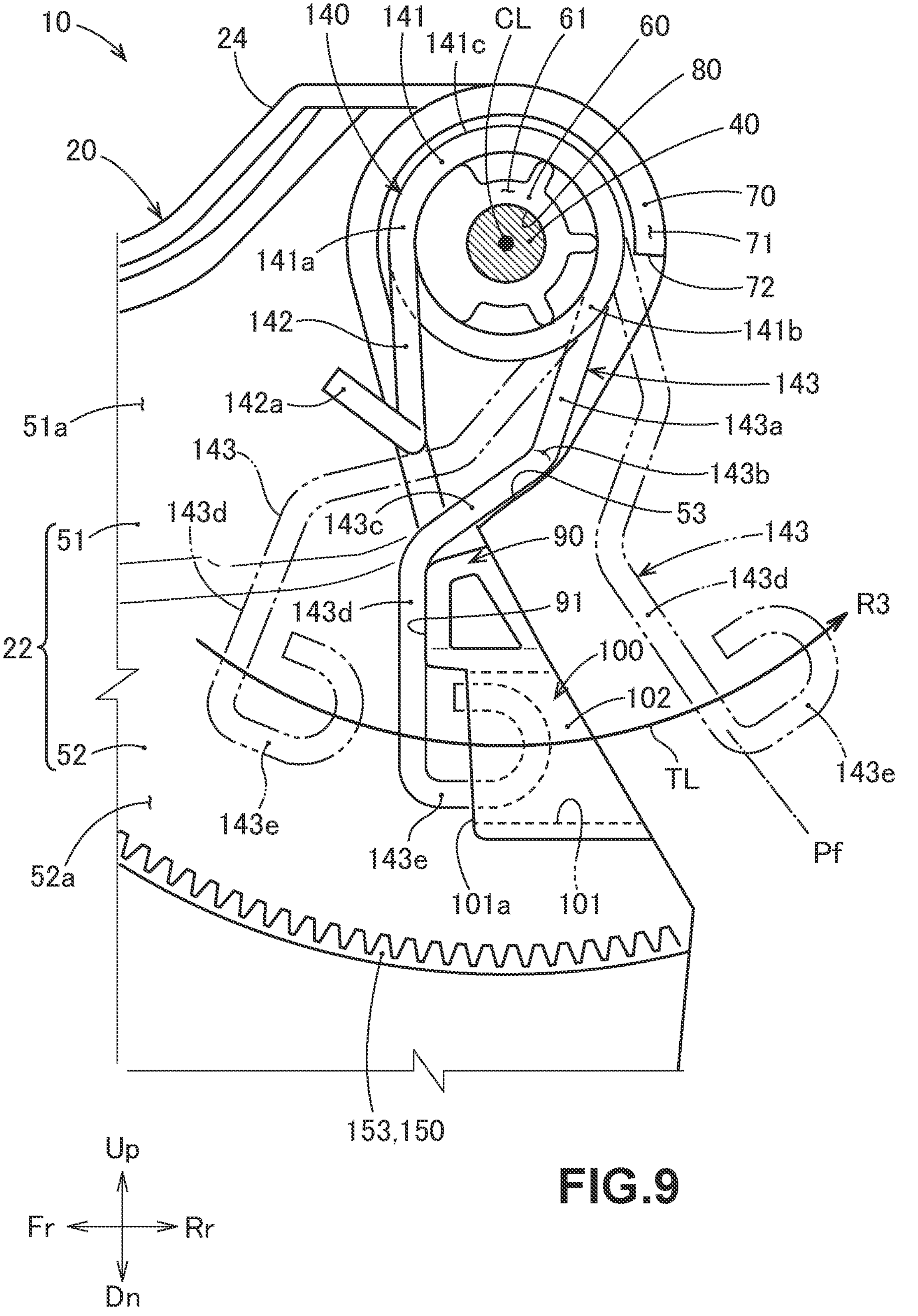
FIG. 9 illustrates a side view of a configuration in which only a second arm of the torsion spring engages with the bracket illustrated in FIG. 4.

As illustrated in FIG. 9, when the torsion spring 140 in a free condition in which no load is applied from the outside is viewed in the center direction of the coil 141 (in the direction of the axial line CL of the support shaft 40), the first arm 142 and the second arm 143 face in the same direction.

The second arm 143 extends radially outward than the cover 70. Specifically, the second arm 143 includes a first arm 143*a* that extends from the second winding end 141*b* of the coil 141, a second arm 143*b* that extends from the tip of the first arm 143*a*, a third arm 143*c* that extends from the tip of the second arm 143*b*, a fourth arm 143*d* that extends from the tip of the third arm 143*c*, and a protrusion 143*e* formed at the tip of the fourth arm 143*d*. The arms 143*a*-143*d* and the protrusion 143*e* are integral with the coil 141.

As illustrated in FIGS. 2 and 3, the first arm 143*a* extends downward from the second winding end 141*b* of the coil 141 to the step surface 53 along the outer surface 51*a* of the upper bracket 51.

The second arm 143*b* extends laterally from the distal end of the first arm 143*a* to the outer surface 52*a* of the lower bracket 52 along the step surface 53.

The third arm 143*c* extends in the front lower direction from the distal end (tip) of the second arm 143*b* to the second engagement portion 90 along the step surface 53.

The fourth arm 143*d* extends downward from the distal end (tip) of the third arm 143*c* along the second engagement portion 90. Since the fourth arm 143*d* can engage with the second engagement portion 90, the fourth arm 143*d* may be referred to as an engagement portion 143*d* (second engagement portion or a hook 143*d*). That is, at the radial direction outer end of the second arm 143, formed is the second engaging portion 143*d* that can engage with the second engagement portion 90. Furthermore, the third arm 143*c* has the protrusion 143*e* at the distal end thereof.

As the torsion spring 140 hooks the first engaging portion 142*a* of the first arm 142 to the first engagement portion 130 and hooks the second engaging portion 143*d* of the second arm 143 (third arm 143*c*) to the second engagement portion 90, the torsion spring 140 generates a biasing force (spring force) to bias the lid 30 in the lid opening directional R1.

As illustrated in FIG. 9, the second engagement portion 90 has an engagement surface 91 on which the second engagement portion 90 can hook. When the first engaging portion 142*a* hooks to the first engagement portion 130 (see FIG. 2), the engagement surface 91 faces in the directional R3 for receiving the biasing force from the second engaging portion 143*d*. The engagement surface 91 is offset forward from the axial line CL of the support shaft 40.

As illustrated in FIGS. 4 and 9, the disengagement restricting portion 100 has a recess 101 that can catch (receive) the protrusion 143*e* of the second engaging portion 143*d*. The recess 101 is formed by a wall 102 of the disengagement restricting portion 100.

As illustrated in FIG. 9, the recess 101 is located on a turning locus TL of the protrusion 143*e* (including the vicinity of the turning locus within a certain tolerance) in the direction R3 in which the second engagement portion 90 receives the biasing force from the second engaging portion 143*d*. The recess 101 is formed by, for example, a through hole passing through the disengagement restricting portion 100 along the turning locus TL of the protrusion 143*e* (including the vicinity of the turning locus). The recess 101 may be referred to as a through hole 101 in the following description. The through hole 101 is an arcuate hole along the turning locus TL (including the vicinity of the turning locus) or is a straight hole along the tangential line from the arc shape. The through hole 101 (recess 101) has an opening 101*a* to receive the protrusion 143*e*. The opening 101*a* faces in the directional R3 in which the second engagement portion 90 receives the biasing force from the second engaging portion 143*d*.

The protrusion 143*e* protrudes toward the opening 101*a* of the recess 101 from the second engaging portion 143*d*. For example, it is possible to configure the protrusion 143*e* by bending the free end of the second engaging portion 143*d*. When the second engaging portion 143*d* engages with the second engagement portion 90, the protrusion 143*e* is fitted from the opening 101*a* into the recess 101. Therefore, the protrusion 143*e* does not disengage from the recess 101 in the direction of the axial line CL of the support shaft 40. Once the second engaging portion 143*d* engages with the second engagement portion 90, it is possible to prevent the disengagement between the second engaging portion 143*d* and the second engagement portion 90.

As illustrated in FIGS. 4 and 9, the protrusion 143*e* has an annular shape along the axial line CL of the support shaft 40. That is, the protrusion 143*e* is configured annularly when viewed from the axial line CL of the support shaft 40. Therefore, the width W1 of the protrusion 143*e* (the size W1 in the direction of the axial line CL of the support shaft 40) is only needed to be equal to the diameter of the wire (coil) of the torsion spring 140, i.e., the width W1 can be very small. Accordingly, it is possible to reduce the width W2 of the recess 101. An amount of protrusion Pa of the disengagement restricting portion 100 that protrudes outward from the outer surface 52*a* of the lower bracket portion 52 (outward in the direction of the axial line CL of the support shaft 40) is only needed to be a sum of the width W2 of the recess 101 and the thickness W3 of the wall 102, i.e., the amount of protrusion Pa can be very small. It should be noted that the annular form is arbitrary, and it is preferably a circular rounding shape.

The cover 70 of the bracket 22 has clearance (cutout) 72 that allows the second arm 143 to pass without interference. Referring also to FIG. 3, the clearance 72 is a notched groove which is cut from the end face 71 of the cover 70 to the outer surface 52*a* of the lower bracket 52. As illustrated in FIG. 3, the clearance 72 is formed in a rectangular shape when viewed from the radial direction of the coil 141.

As illustrated in FIG. 2, when the first engaging portion (hook) 142*a* engages with the first engagement portion 130 and the second engaging portion 143*d* does not engage with the second engagement portion 90 (i.e., the second engaging portion 143*d* is in a free condition), this state is referred to as a "first state". The position of the second engaging portion 143*d* in the first state is referred to as a "free position Pf". When the second engaging portion 143*d* is inclined from the free position Pf in the direction opposite to the second engagement portion 90 to engage the second engaging portion 143*d* with the second engagement portion 90, this state is referred to as a "second state". When the second engaging portion 143*d* in the second state engages with the second engagement portion 90, this state is referred to as a "third state".

The size of the clearance 72 is set such that the second arm 143 does not hit the cover 70 when the second engaging portion 143*d* moves from the first state to the third state through the second state.

As illustrated in FIG. 2, the storage device 10 also includes a speed relaxation device 150 that relaxes the opening/closing speed of the lid 30 by the biasing force of the torsion spring 140. The speed relaxation device 150 includes an oil damper 151 provided on the leg 31 of the lid 30, a pinion 152 provided rotatably on the oil damper 151, and an arc-shaped sector gear 153 provided on the bracket 22 of the container 20 such that the pinion 152 engages with the sector gear 153.

Next, the assembly procedure of the support structure of the lid 30 to the container 20 will be described with reference to FIG. 4.

First, the coil 141 of the torsion spring 140 is fitted to the coil support 60 of the bracket 22 (coil fitting step).

Next, the center CL of the first shaft support hole 110 (axial line CL) is aligned with the center CL of the second shaft support hole 80 (axial line CL) (hole alignment step). Specifically, as illustrated in FIGS. 7 and 8, the inner peripheral surface 33*a* of the alignment portion 33 is fitted over (put on) the outer peripheral surface 73 of the cover 70. As a result, the center CL of the shaft support hole 110 of the leg 31 accurately coincides with the center CL of the shaft support hole 80, and the aligned state is maintained by the alignment portion 33.

Subsequently, the assembling work of the support shaft 40 and the engaging work of the first arm 142 of the torsion spring 140 are carried out. The assembling work of the support shaft 40 and the engaging work of the first arm 142 may be carried out in an arbitrary order (which work is carried out after which work is arbitrary).

For example, if the assembling work of the support shaft 40 should be carried out first, the support shaft 40 is fitted into the shaft support holes 80 and 110 while the center CL of the shaft support hole 80 is coinciding with the center CL of the shaft support hole 110 (shaft assembling step). Thus, the support shaft 40 is assembled to the shaft support holes 80 and 110 respectively (see also FIG. 6), and the lid 30 is assembled to the container 20 such that the lid 30 can open and close relative to the container 20. That is, the container 20, the lid 30 and the support shaft 40 are assembled.

Then, the engaging work of the first arm 142 is performed (first arm engaging step). Specifically, the first engaging portion 142*a* of the first arm 142 of the torsion spring 140 is engaged with the first engagement portion 130 of the leg 31. Thus, the first arm 142 is brought into a state of being engaged with the lid 30. During the engaging work, the second engaging portion 143*d* of the second arm 143 is not engaged with the second engagement portion 90. The second arm 143 is located in the free position Pf illustrated by the imaginary line in FIG. 2. This state is a so-called free state in which a load (biasing force of the torsion spring 140) is not applied to the torsion spring 140. Therefore, when the first arm 142 is engaged with the first engagement portion 130, the engaging work is not affected by the biasing force of the torsion spring 140, i.e., the engaging work can be carried out easily.

Finally, the second engaging portion 143*d* of the second arm 143 is engaged with the second engagement portion 90 of the bracket 22 (second arm engaging step). Specifically, the second arm 143 positioned in the free position Pf illustrated in FIG. 2 is tilted outward in the direction of the axial line CL of the support shaft 40, the second arm 143 is displaced to the engagement surface 91 against the biasing force of the torsion spring 140 while avoiding the second engagement portion 90 and the disengagement restricting portion 100. Then, the second engaging portion 143*d* of the second arm 143 is engaged with the engagement surface 91 of the second engagement portion 90. As a result, the second arm 143 is in a state of being engaged with the container 20. At the same time, the protrusion 143*e* of the second engaging portion 143*d* is fitted in the recess 101 of the disengagement restricting portion 100. Thus, the assembly work is completed.

On the other hand, if the engaging work of the first arm 142 should be carried out first, the first arm engaging work is performed, and the first engaging portion 142*a* of the first arm 142 of the torsion spring 140 is engaged with the first engagement portion 130 of the leg 31. Then, the second arm engaging step is carried out, and the second engaging portion 143*d* of the second arm 143 is engaged with the second engagement portion 90 of the bracket 22. Finally, the shaft assembling step is carried out such that the support shaft 40 is fitted into the respective shaft support holes 80 and 110 in the condition in which the center CL of the shaft support hole 80 is aligned with the center CL of the shaft support hole 110. Thus, the assembly work is completed. In this assembling process, the shaft assembling step may be carried out after the first arm engaging step, and then the second arm engaging step may be performed as the final step.

As apparent from the foregoing description, the second arm 143 can be engaged with the container 20 in the state in which the container 20, the lid 30 and the support shaft 40 are assembled and in the state in which the first arm 142 is engaged with the lid 30.

Second Embodiment

Figure 10:
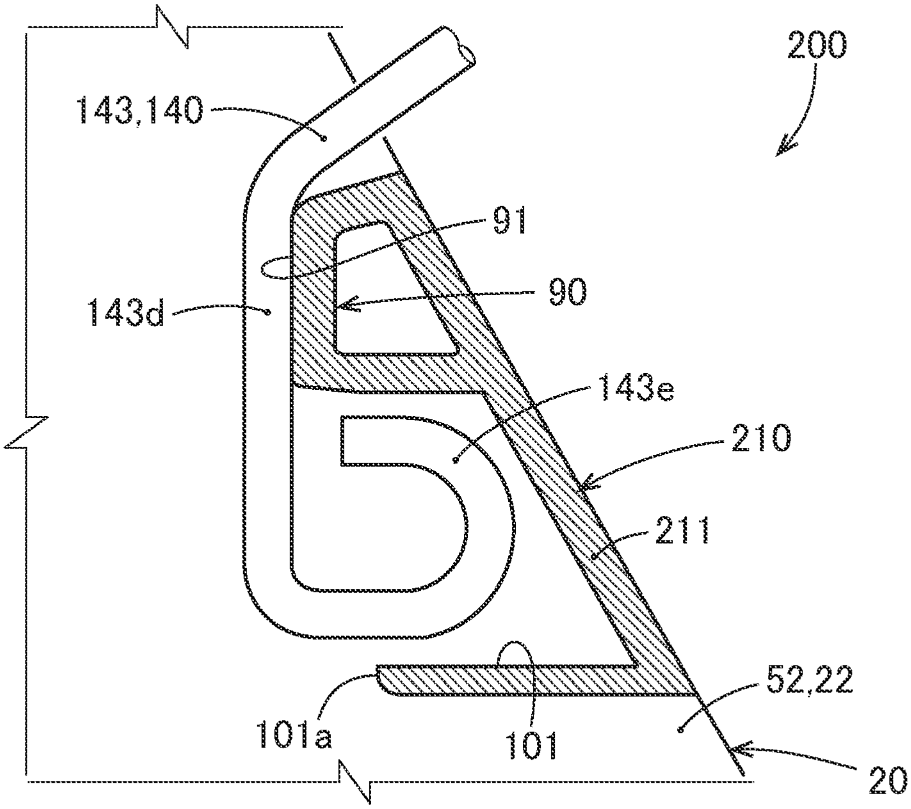
FIG. 10 illustrates a cross-sectional view of a portion for restricting disengagement in a storage device according to a second embodiment of this disclosure.

Referring to FIG. 10, a storage device 200 of the second embodiment will be described. FIG. 10 corresponds to FIG. 9.

The storage device 200 of the second embodiment is characterized by a configuration in which the disengagement restricting portion 100 of the storage device 10 of the first embodiment illustrated in FIGS. 1-9 is replaced with a disengagement restricting portion 210 illustrated in FIG. 10. Other basic configuration of the storage device 200 is the same as the storage device 10 of the first embodiment. For the elements and portions common to the storage device 10 of the first embodiment, the same reference numerals will be used and a detailed description thereof will be omitted.

Specifically, the disengagement restricting portion 210 of the second embodiment is different from the disengagement restricting portion 100 of the first embodiment in that the portion opposite to the opening 101*a* of the recess 101 of the disengagement restricting portion 100 is closed by a bottom 211, i.e., the disengagement restricting portion 210 has the bottom 211. Therefore, the protrusion 143*e* is surrounded by the wall 102 of the disengagement restricting portion 100 and is also surrounded by the bottom 211. It is possible to restrict the protrusion 143*e*, which is fitted into the recess 101, from being pushed out from the opposite side to the opening 101*a*.

The storage device 200 of the second embodiment can exhibit the advantageous effects of the second embodiment, and also exhibit the same advantageous effects as the advantageous effects of the storage device 10 of the first embodiment.

Third Embodiment

Figure 11:
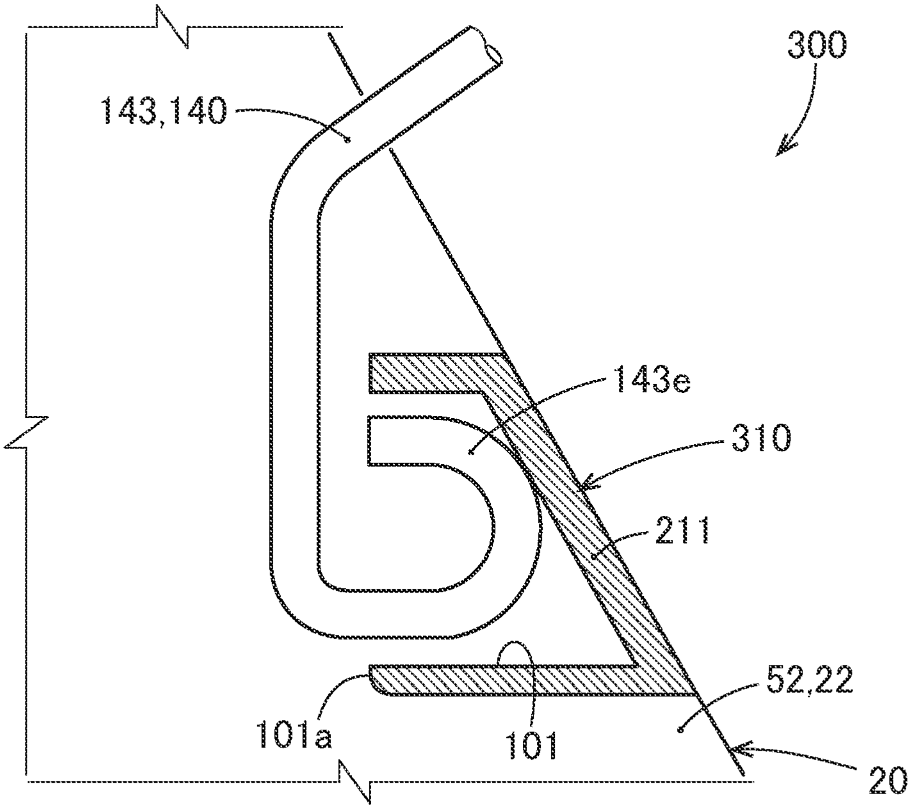
FIG. 11 illustrates a cross-sectional view of a second engagement portion, a second engaging portion, a disengagement restricting portion and their vicinity of a storage device according a third embodiment of this disclosure.

Referring to FIG. 11, a storage device 300 of the third embodiment will be described. FIG. 11 corresponds to FIG. 10.

The storage device 300 of the third embodiment is characterized by a configuration in which the disengagement restricting portion 210 of the storage device 200 of the second embodiment illustrated in FIG. 10 is replaced with a disengagement restricting portion 310 illustrated in FIG. 11. Other basic configuration of the storage device 300 is the same as the storage device 200 of the second embodiment. For the elements and portions common to the storage device 200 of the second embodiment, the same reference numerals will be used, and a detailed description thereof will be omitted.

Specifically, in the third embodiment, the second engagement portion 90 of the second embodiment illustrated in FIG. 10 is dispensed with, and the bottom 211 of the disengagement restricting portion 310 (corresponding to the bottom 211 of the disengagement restricting portion 210 of the second embodiment) has an additional role, i.e., the bottom 211 also serves as the second engagement portion 90 of the second embodiment. That is, the bottom 211 of the third embodiment has the function of the second engagement portion 90.

As the protrusion 143*e* of the second arm 143 contacts the bottom 211, the second arm 143 is brought into a condition of being engaged with the container 20. In this state, the protrusion 143*e* has the function of the engaging portion of the second arm 143. In the following description, the protrusion 143*e* may be referred to as a second engaging portion 143*e*.

In the third embodiment, as described above, a combination of the bottom 211 and the protrusion 143*e* (second engaging portion 143*d*) fulfils the engagement function, and a combination of the wall 102, which defines the recess 101 (see FIG. 4), and the protrusion 143*e* fulfils the disengagement restricting function. The disengagement restricting portion 310 may be referred to as a second engagement portion 310. Since the second engagement portion 90 of the second embodiment is dispensed with, it is possible to simplify the configuration.

The storage device 300 of the third embodiment exhibits the advantageous effects of the third embodiment and also exhibits the same effects as the advantageous effects of the storage device 10 of the first embodiment and the storage device 200 of the second embodiment.

Each of the above-described storage devices 10, 200 and 300 achieves the following advantageous effects.

Reference is made to FIGS. 1, 2 and 9-11. According to a first aspect, the storage device 10 (including the storage device 200, 300) includes: the container 20;

- the lid 30 for opening and closing the opening 21 of the container 20;
- the support shaft 40 for supporting the lid 30 with respect to the container 20 such that the lid 30 can open and close relative to the container 20;
- the torsion spring 140 that has the coil 141 located along the axial line CL of the support shaft 40, the first arm 142 that extends from the one winding end 141*a* (the first winding end 141*a*) of the coil 141 to the lid 30 and can be engaged with the lid 30, and the second arm 143 that extends from the other winding end 141*b* (the second winding end) of the coil 141 to the container 20 and can be engaged with the container 20 when the container 20, the lid 30 and the support shaft 40 are in the assembled state and the first arm 142 is engaged with the lid 30, the torsion spring 140 being configured to bias the lid 30 toward the directional R2 to close the lid 30 or toward the direction R1 to open the lid 30; and the cylindrical cover 70 integrally formed with the container 20 such that the cover 70 surrounds the outer peripheral surface 141*c* of the coil 141.

The second arm 143 extends radially outward than the cover 70. At the radially outer end of the second arm 143, formed is the engaging portion 143*d* (second engaging portion 143*d*) that can engage with the engagement portion 90 of the container 20 (the second engagement portion 90). The cover 70 has the clearance (cutout) 72 that allows the second arm 143 to pass without interference.

When the container 20, the lid 30 and the support shaft 40 are assembled, and the first arm 142 of the torsion spring 140 is engaged with the lid 30, the second arm 143 of the torsion spring 140 is not engaged with the container 20. In this condition, the load (biasing force of the torsion spring 140) is not applied to the one winding end 141*a* (the first winding end 141*a*) of the torsion spring 140 and the other winding end 141*b* (the second winding end 141*b*). Therefore, when assembling the container 20, the lid 30 and the support shaft 40 and engaging the first arm 142 of the torsion spring 140 with the lid 30, the assembling work is not affected by the biasing force of the torsion spring 140, and the center CL of the support shaft 40 (axial line CL) can easily be aligned with the respective shaft support holes 80 and 110.

Moreover, the engaging portion 143*d* of the second arm 143 (second engaging portion 143*d*) is located radially outward from the cover 70. Therefore, the distance from the coil 141 to the second engaging portion 143*d* is long. Accordingly, the force needed to engage the engaging portion 143*d* with the engagement portion 90 (second engagement portion 90) is small. Thus, the engaging work of the second arm 143 is easy.

In the above-described configuration, since the distance from the coil 141 to the second engaging portion 143*d* is long, consideration is required so as not to interfere with the cover 70. If the second arm 143 is caused to swing in a manner that avoids the interference with the cover 70 during the engaging work, it would result in poor workability. One conceivable solution to this problem may be inclining the second arm 143 greatly relative to the cylindrical cover 70 in the axial line CL of the support shaft 40 during the engaging work. In this solution, however, an amount of inclination in the direction of the axial line CL is large from a proximal end of the second arm 143 (corresponding to the second winding end 141*b* of the coil 141) to the distal end (second engaging portion 143*d*). In order to ensure smooth biasing movement (action) of the second arm 143, there is room for improvement.

In contrast, the cover 70 of this embodiment has the clearance 72 that allows the second arm 143 to pass without interfering with the cover 70. Therefore, the long second arm 143 extending radially outward than the cover 70 can easily engage with the engagement portion 90 of the container 20 without interfering with the cover 70. Moreover, it is possible to significantly reduce the amount of inclination of the second arm 143 in the direction of the axial line CL.

Thus, it is possible to ensure the smooth biasing movement of the torsion spring 140 while improving the assembling workability of the storage device 10 (including the storage device 200, 300).

Reference is made to FIGS. 9-11. A storage device of a second aspect is directed to the storage device 10 of the first aspect (including storage device 200, 300), and the second arm 143 has the protrusion 143*e* at the distal end (tip) thereof. The container 20 has the recess 101 that can receive the protrusion 143*e* therein. The recess 101 is located on the turning locus TL of the protrusion 143*e* (including the vicinity of the turning locus) in the direction R3 in which the engagement portion 90 receives the biasing force from the second engaging portion 143*d*.

In other words, as illustrated in FIGS. 1, 2 and 9-11, the storage device 10 (including the storage device 200, 300) includes the container 20, the lid 30 for opening and closing the opening 21 of the container 20, the support shaft 40 for supporting the lid 30 with respect to the container 20 such that the lid 30 can open and close relative to the container 20, and the torsion spring 140 for urging the lid 30 in the direction R2 to close the lid 30 or in the direction R1 to open the lid 30. The torsion spring 140 includes the coil 141 located along the axial line CL of the support shaft 40, the first arm 142 that extends from one winding end 141*a* of the coil 141 (first winding end 141*a*) to the lid 30 and can engage with the lid 30, and the second arm 143 that extends from the other winding end 141*b* of the coil 141 (second winding end 141*b*) to the container 20 and can engage with the container 20. The second arm 143 has the protrusion 143*e*. The container 20 has the recess 101 that can tightly receive the protrusion 143*e* therein. The recess 101 is located on the turning locus TL of the protrusion 143*e* (including the vicinity of the turning locus) in the direction R3 in which the container 20 receives the biasing force from the second arm 143.

Therefore, the protrusion 143*e* of the second arm 143 fits into the recess 101 of the container 20 so that the second engaging portion 143*d* does not come off from the engagement portion 90 (second engagement portion 90). Moreover, the storage device 10 can be made compact as compared with a configuration in which the free end of the second arm hooks on the rod-shaped bar extending from the container 20.

Reference is made to FIGS. 9-11. A storage device of a third aspect is directed to the storage device 10 of the second aspect (including the storage device 200, 300), and the protrusion 143*e* has an annular shape when viewed along the axial line CL of the support shaft 40. Since the annular protrusion 143*e* faces in the direction along the axial line CL, it is possible to reduce the width of the recess 101 that receives the protrusion 143*e*. Therefore, the storage device 10 can be made more compact.

Reference is made to FIGS. 9-11. A storage device of a fourth aspect is directed to the storage device 10 of the third aspect (including the storage device 200, 300), and the opening 101*a* of the recess 101 faces in the direction R3 in which the biasing force from the engaging portion 143*d* (second engaging portion 143*d*) is received by the engagement portion 143*c*. The protrusion 143*e* protrudes toward the opening 101*a* of the recess 101. Thus, the fitting direction of the protrusion 143*e* into the recess 101 can be the same as the biasing direction R3 of the second arm 143. Consequently, it is possible to stably maintain the engaged state of the second engaging portion 143*d* of the second arm 143 with the engagement portion 143*c* of the container 20.

Reference is made to FIGS. 6-8. A storage device of a fifth aspect is directed to the storage device 10 of any one of the first to fourth aspects (including the storage device 200, 300) and has the alignment portion 33 that aligns the axial line CL of the support shaft 40 between the container 20 and the lid 30. Therefore, the alignment portion 33 can reliably and easily align the center CL of the shaft support hole 110 of the leg 31 with the center CL of the shaft support hole 80 and can easily maintain the aligned condition. Thus, even if the second engaging portion 143*d* of the second arm 143 engages with the second engagement portion 90 prior to fitting the support shaft 40 into the shaft support hole 80, 110, the alignment portion 33 can suppress or eliminate the misalignment (discrepancy) between the center CL of the shaft support hole 80 and the center CL of the shaft support hole 110.

Reference is made to FIGS. 4 and 9. A storage device of a sixth aspect is directed to the storage device 10 of any one of the first to fifth aspects (including the storage device 200, 300), and the second arm 143 has the protrusion 143*e* at the distal end thereof. The container 20 (console box body 20) has the recess 101 that can receive the protrusion 143*e* therein.

Reference is made to FIG. 9. A storage device of a seventh aspect is directed to the storage device 10 of the sixth aspect (including the storage device 200, 300), and the recess 101 is located on the turning locus TL of the protrusion 143*e* in the direction R3 in which the biasing force from the engaging portion 143*d* is received by the engagement portion 90.

Reference is made to FIGS. 4 and 9. A storage device of an eighth aspect is directed to the storage device 10 of the seventh aspect (including the storage device 200, 300), and the protrusion 143*e* has an annular shape when viewed from the direction along the axial line CL of the support shaft 40.

Reference is made to FIGS. 4 and 9. A storage device of a ninth aspect is directed to the storage device 10 of the seventh aspect (including the storage device 200, 300), and the opening 101*a* of the recess 101 faces in the direction R3 in which the biasing force from the engaging portion 143*d* is received by the engagement portion 90. The protrusion 143*e* protrudes toward the opening 101*a* of the recess 101.

As long as the operation and advantageous effects of the present invention are achieved, the present invention is not limited to the embodiments.

For example, the protrusion 143*e* may only need to protrude toward the opening 101*a* of the recess 101 and is not limited to the annular configuration. For example, the protrusion 143*e* may have a rod shape that projects toward the opening 101*a* of the recess 101. Further, the recess 101 may be formed so as to penetrate the thickness of the brackets 22, and the protrusion 143*e* may have a key shape and be tightly caught in the recess 101.

Each of the storage devices 10, 200 and 300 of the present invention is suitable for use as a vehicle center console box.

What is claimed is:

1. A storage device comprising:

a container;

a lid for opening and closing an opening of the container;

a support shaft for supporting the lid with respect to the container such that the lid can open and close relative to the container;

a torsion spring that includes a coil located along an axial line of the support shaft, a first arm extending from one winding end of the coil to a first engagement portion of the lid and can engage with the lid, and a second arm extending from an opposite winding end of the coil to the container and can engage with a second engagement portion of the container when the container, the lid and the support shaft are in an assembled state and the first arm is engaged with the first engagement portion of the lid, the torsion spring being configured to bias the lid in a direction to open the lid; and a cylindrical cover formed integrally with the container such that the cylindrical cover can surround an outer peripheral surface of the coil, the first arm including a first engaging portion such that the first engaging portion engages with the first engagement portion, the second arm extending outward in a radial direction beyond the cylindrical cover, and having an engaging portion at an outer end of the second arm in the radial direction such that the second engaging portion engages with the second engagement portion of the container, and the cylindrical cover having a clearance that allows the second arm to pass without interference, wherein the first engaging portion and the second engaging portion are movable between a first state, a second state, and a third state, the first state being when the first engaging portion engages with the first engagement portion and the second engaging portion does not engage with the second engagement portion, a position of the second engaging portion in the first state is referred to as a free position, the second state being when the second engaging portion is inclined from the free position in a direction opposite to the second engagement portion to engage the second engaging portion with the second engagement portion, the third state being when the second engaging portion in the second state engages with the second engagement portion, a size of the clearance is set such that the second arm does not hit the cylindrical cover when the second engaging portion moves from the first state to the third state through the second state.

2. The storage device according to claim 1, further comprising an alignment portion for aligning the axial line of the support shaft between the container and the lid.

3. A storage device comprising:

a container:

a lid for opening and closing an opening of the container;

a support shaft for supporting the lid with respect to the container such that the lid can open and close relative to the container;

a torsion spring that includes a coil located along an axial line of the support shaft, a first arm extending from one winding end of the coil to the lid and can engage with the lid, and a second arm extending from an opposite winding end of the coil to the container and can engage with the container when the container, the lid and the support shaft are in an assembled state and the first arm is engaged with the lid, the torsion spring being configured to bias the lid in a direction to close the lid or in a direction to open the lid; and a cylindrical cover formed integrally with the container such that the cylindrical cover can surround an outer peripheral surface of the coil, the second arm extending outward in a radial direction beyond the cylindrical cover, and having an engaging portion at an outer end of the second arm in the radial direction such that the engaging portion engages with an engagement portion of the container, and the cylindrical cover having a clearance that allows the second arm to pass without interference, wherein the second arm has a protrusion at a tip thereof, the container has a recess that receives the protrusion therein, and the recess is located on a turning locus of the protrusion in a direction in which the engagement portion receives a biasing force from the engaging portion.

4. The storage device according to claim 3, wherein the protrusion has an annular shape when viewed from a direction along the axial line of the support shaft.

5. The storage device according to claim 4, wherein an opening of the recess faces in the direction in which the engagement portion receives the biasing force from the engaging portion, and the protrusion protrudes toward the opening of the recess.

* * * * *